United States Patent [19]

Sivachenko

[11] 3,908,493

[45] Sept. 30, 1975

[54] METHOD FOR SALVAGING SCRAP METAL

[76] Inventor: Eugene W. Sivachenko, 6851 Waverly Manner, Redding, Calif. 96001

[22] Filed: Apr. 25, 1974

[21] Appl. No.: 464,596

[52] U.S. Cl. .......................... 83/23; 29/403; 83/49; 83/916; 83/917; 83/925 R
[51] Int. Cl.²......................................... B21D 28/02
[58] Field of Search ............ 83/916, 917, 918, 559, 83/580, 49, 48, 43, 925 R, 23; 30/228, 241, 231; 29/403

[56] References Cited
UNITED STATES PATENTS

| | | | |
|---|---|---|---|
| 644,719 | 3/1900 | McDowell | 29/403 |
| 2,052,630 | 9/1936 | Hoskwith | 83/918 X |
| 2,217,393 | 10/1940 | Webb | 30/241 |
| 3,025,600 | 3/1962 | Leibinger | 30/241 |
| 3,615,084 | 10/197 | Wasinger | 29/403 UX |

*Primary Examiner*—Frank T. Yost
*Attorney, Agent, or Firm*—Townsend and Townsend

[57] ABSTRACT

Large metallic structures such as vessels, railroad cars or the like are salvaged by disintegrating the structures into small, readily handled pieces of scrap metal for shipment of the pieces to a steel mill or the like. A portable shear is provided which comprises a tubular female shear member having a first arcuate cutting edge and a cylindrical male shear element which defines a second, cooperating cutting edge and which reciprocates within the tubular member. With the cutting edges in their spaced-apart positions the shear is placed over an edge of the structure and power means is actuated to move the cutting edges against each other and to thereby sever a relatively small piece of scrap metal from the structure. Thereafter, the cutting edges are retracted, the shear is relocated to another, e.g. adjacent portion of the structure and another piece of scrap metal is severed. The cutting edges are angularly inclined with respect to each other so that each piece is sequentially severed from the structure to thereby reduce the force that must be exerted to effect the shearing operation. Means is further provided to limit the maximum size of the severed piece to less than an interior opening of the tubular member so that the severed piece is readily removed therefrom without the exertion of a mechanical removal force.

13 Claims, 9 Drawing Figures

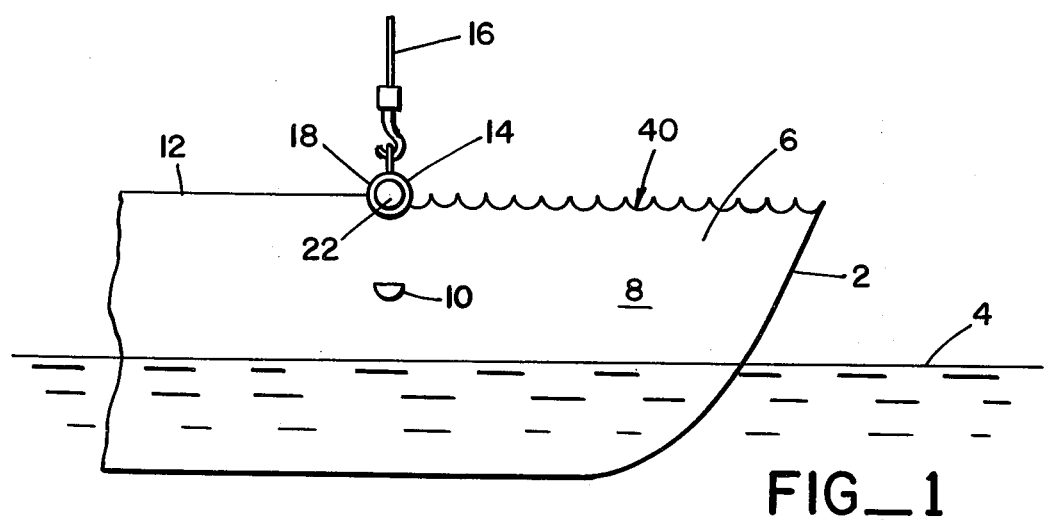
FIG_1
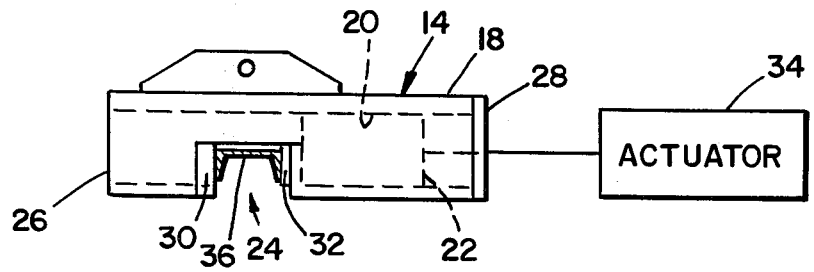
FIG_2
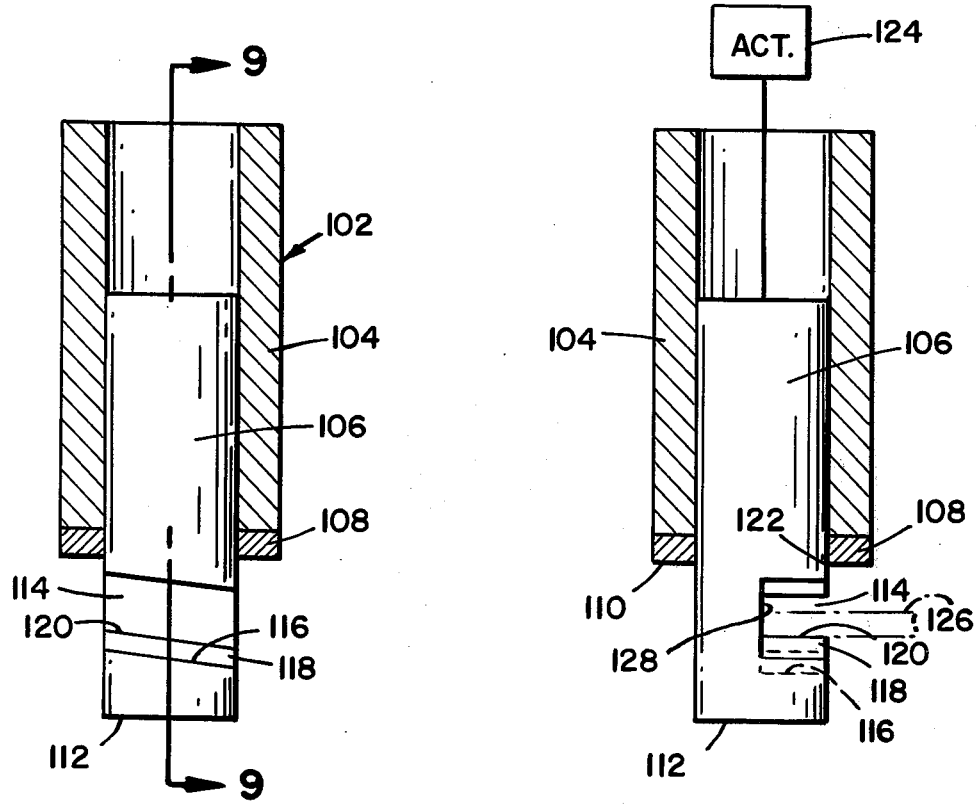
FIG_8
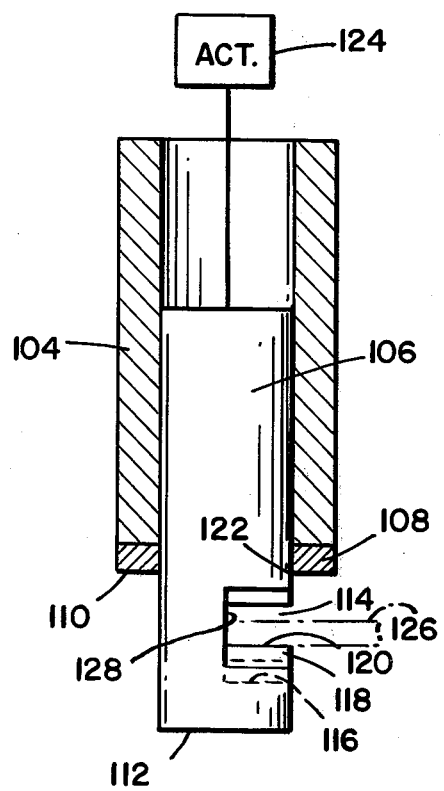
FIG_9

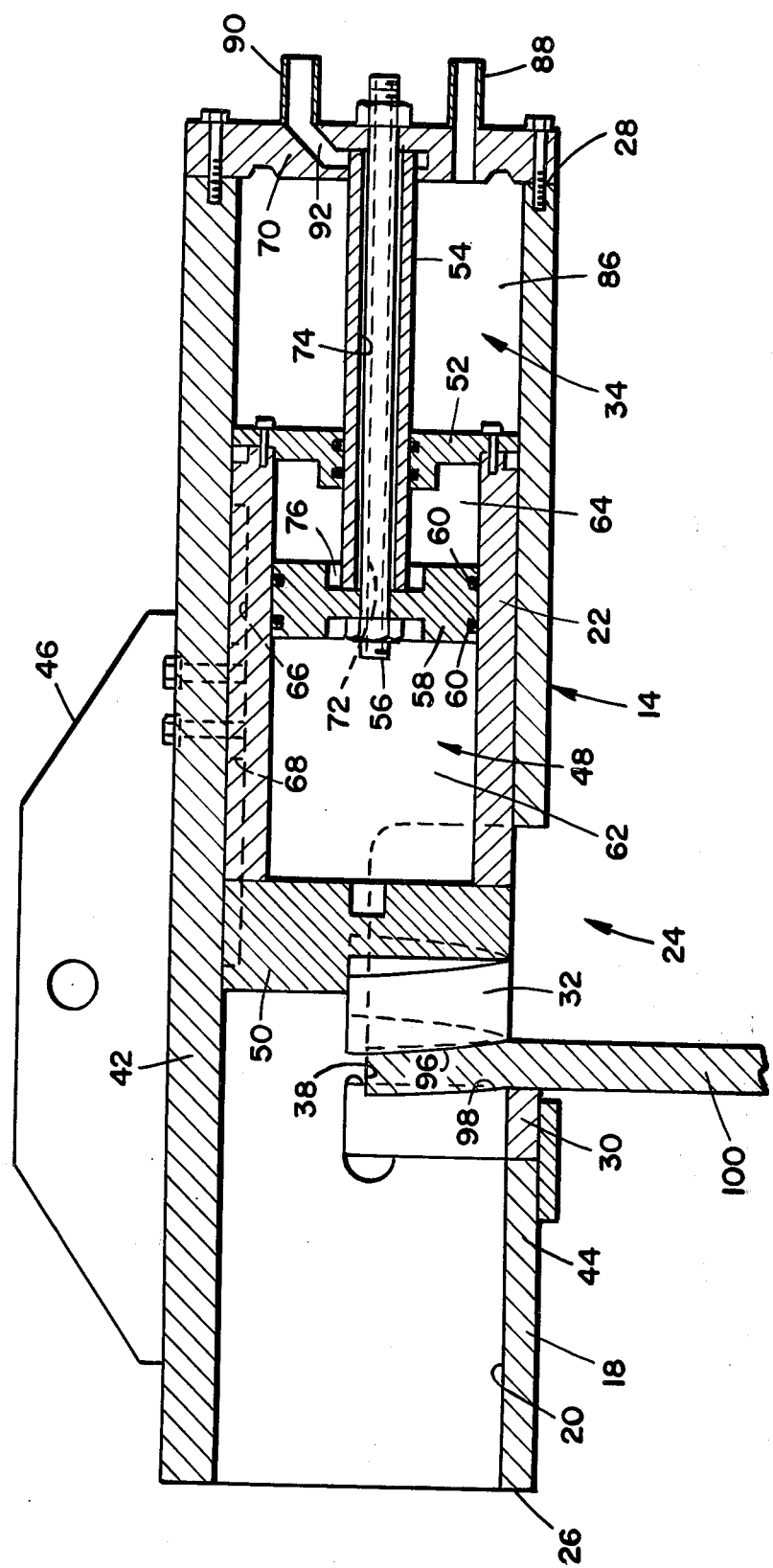

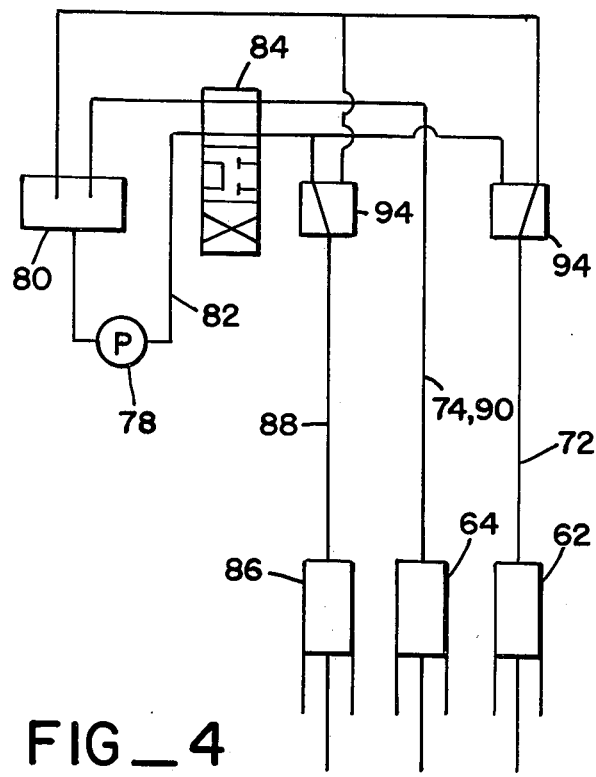
FIG_4
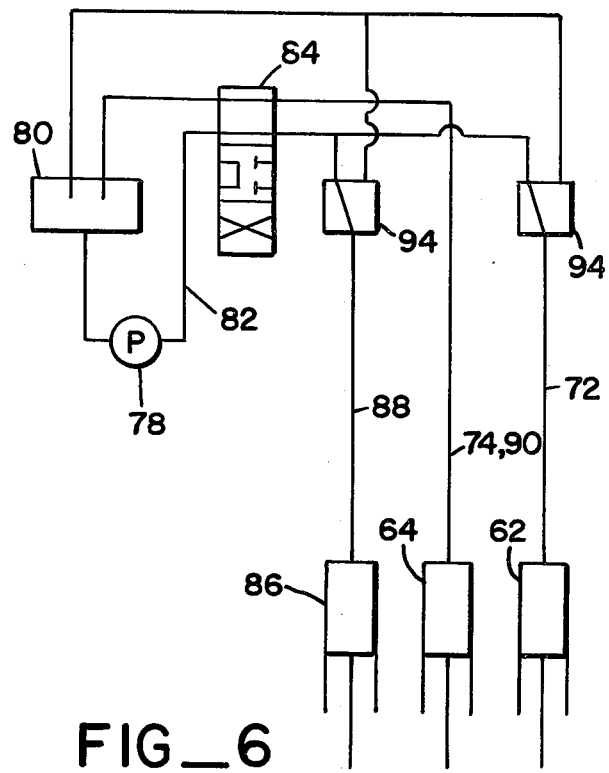
FIG_6
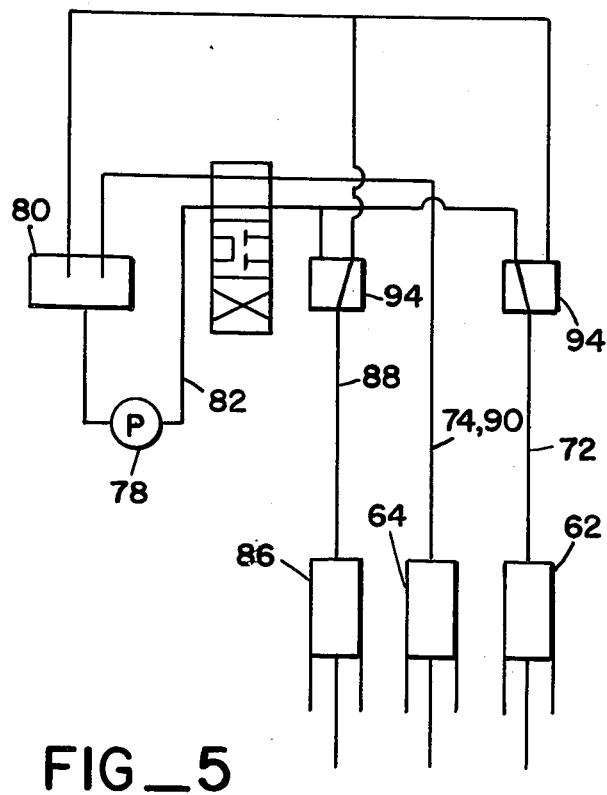
FIG_5
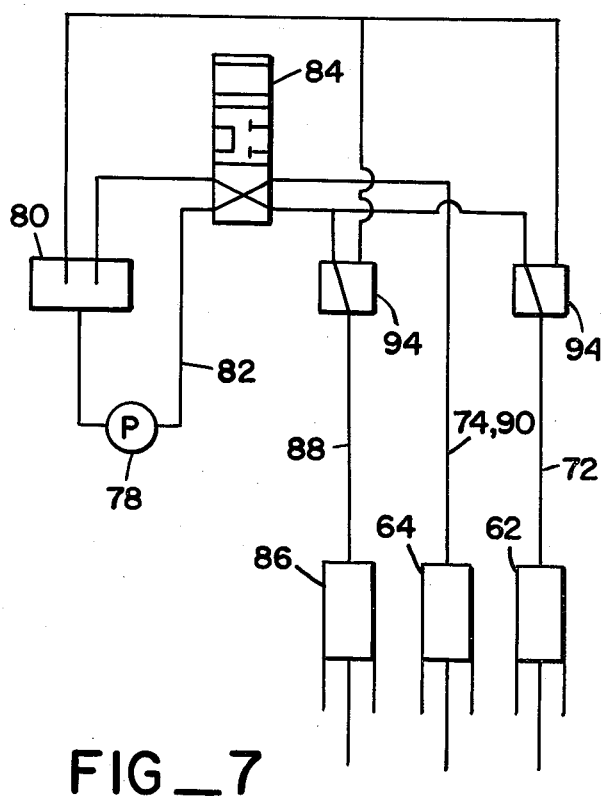
FIG_7

METHOD FOR SALVAGING SCRAP METAL

BACKGROUND OF THE INVENTION

An ever sparser supply of metal ore, particularly iron ore makes it increasingly important to salvage old and surplus metal structures. When the structures are relatively small, such as metal shavings and the like, there is little problem in salvaging and reusing them as scrap metal. Even larger structures such as passenger automobiles are readily salvaged by placing them in presses and compacting them into small compressed metal packages which are then forwarded to a steel mill for remelting and manufacture into steel ingots and the like.

However, when the structures become larger their salvage becomes more difficult since it is normally impossible to ship them to and use them in a steel mill due to their bulk and weight. They must therefore be cut or severed into smaller, more readily handled pieces. The salvage of large ocean-going vessels and railroad cars, for example, requires that the structure be cut up in the field and shipped to the mill before they can be melted.

In the past such a structure, say a vessel, was salvaged by systematically dismantling it, i.e. by torch or flame cutting it into smaller components. Conventional hoisting equipment such as a crane then lifts the components, say a portion of the vessel's bridge or a section of its hull on land where the component is further cut down in size with torch cutting equipment or, to the extent presses are available by shearing the components into relatively small pieces of scrap metal. In instances where the vessel is not too far from a factory which has an industrial shear available, it is also common to transport the dismantled components to the factory and there shear them into small scrap metal pieces.

The ever-increasing price of scrap metal now makes such methods economically more feasible even though they require much manpower and consume large amounts of expensive cutting gas. Furthermore, the commonly encountered heavy layer or layers of paint, rust, organic or inorganic substances such as scum, barnacles, etc. on vessels being salvaged can make torch cutting difficult if not impossible. Conventional torch cutting equipment cannot cut through heavy layers of rust, scum or paint and the paint has a tendency to sputter and generates so much smoke that it may impair the cutting operation, speed and accuracy. Thus, the rust, paint, etc. is ordinarily first scraped or burned off along the cutting line before the actual torch cutting commences to eliminate the mentioned problems and hazards.

Moreover, after the relatively large component has been dismantled and transferred on dock or land, it must further be cut down in size to become scrap metal that is accepted by steel mills. Additionally, smaller size scrap yields higher scrap metal prices; it is therefore desirable to cut the component into the smallest possible pieces subject only to limitations caused by the unit cutting costs. Thus, by the time the vessel has been cut down to acceptably small pieces of scrap metal, the unit cost of the scrap metal is relatively high and/or the sales price for the scrap is relatively low. Profit margins are therefore small which discourages the widest possible salvage of old, surplus vessels and other metal structures. This in turn adversely affects the raw material supply and, in time, will necessarily tend to increase metal costs.

SUMMARY OF THE INVENTION

The present invention provides an inexpensive method for salvaging vessels and similarly large metallic structures in the field by cutting the vessel into small, readily handled and accepted pieces of scrap metal. In its broadest aspects the invention replaces the heretofore common flame cutting for dismantling the structures into large components and hence into small pieces of scrap metal with a method by which the vessel is directly sheared into small pieces of scrap. This scrap is then collected and transported to the steel mill.

The present invention greatly facilitates the collection of the scrap since the small pieces that are severed from the vessel can be permitted to drop into and collect in the hold of the vessel. For this purpose it is desirable to cut a sufficient number of holes in the deck and subfloors so that the scrap can be readily collected. Moreover, it may further be desirable to remove interior partitions and non-structural walls to provide sufficient unobstructed space.

After the superstructure and deck have been salvaged and the upper hull edge is a few feet above the waterline the scrap collected in the hull can be removed with suitable magnets and the like for transfer to railroad cars, barges or transport ships. Furthermore, the hull can be towed to deeper waters for the transfer of the scrap to a waiting barge or vessel. Thereafter, the remaining hull can be salvaged in accordance with the present invention. Due to its relatively low weight it can also be hoisted on land to complete its salvage.

The present invention also provides a portable, power actuated shear which, in its preferred form, is defined by a tubular female die member (hereinafter sometimes referred to as "tube") and a cylindrical male die member (hereinafter sometimes referred to as "piston") that is reciprocably disposed within the tube. The tube includes an concave first cutting die insert which defines a first cutting edge and which cooperates with a complementarily shaped convex second die insert with a second cutting edge. The press includes means, such as a semicircular cutout in the tube into which a portion of the structure, say steel plate, may be inserted. This cutout limits the depth to which the plate may be inserted to less than the full diameter of the tube so that when the shear is actuated a piece of scrap metal is severed from the plate which has an outline that is less than the interior diameter of the tube. Consequently, the severed piece does not adhere to the tube but freely drops therefrom under gravity without the need for exerting a mecanical force for the removal of the piece. This greatly facilitates the ease and speed with which the shear can be operated and further reduces its power requirement.

It should be understood that the precise outline configuration of the cutting edge and of the severed scrap metal piece may be other than semicircular. For example, the die inserts may be shaped to have square, triangular, elliptical or other compound outline configurations. Furthermore, the shear may be constructed so that the steel plate extends to more or less than one-half the interior tube diameter to better adapt the shear to a given application. What is important, however, is that the outline of the severed piece of scrap metal is smaller than the interior diameter of the tube for the reason stated above.

For purposes of this specification and the claims the sheared piece of scrap metal will frequently be referred to as having a "convex" outline, edge or configuration. By this is meant that one or more of the edges of the piece may be convexly shaped, or two or more contiguous edges converge upon each other as do, for example, two adjacent sides of a triangle.

When the severed piece has such a shape the cooperating die sections by necessity have a complementary shape. One of the die sections, i.e. the outer or female section, then supports the bulk of the metal plate from which the piece is cut along a complementary concave line which in turn prevents the formation of a bending moment when the two die sections contact the plate between them. As a consequence, neither the plate nor the shear will wedge, tilt or pivot with respect to each other as could occur if the cutting edge were a straight edge as on conventional shears or presses.

The shear of the present invention is used by moving the die inserts apart, aligning the space therebetween with an edge of the vessel, say an edge of a hull plate, thereafter dropping the shear over the edge unitl the plate edge engages the end of the cutout in the tube, and thereafter power actuating the die inserts to sever a generally semicircular piece of scrap metal. To reduce power requirements it is preferred to shape the cutting edge of at least one of the die inserts helically so that at any given moment only a short section of the total cutting edge length shears. Consequently, the scrap metal piece is sequentially sheared along its shear line at a power requirement which is a fraction of what it would be if the two cutting edges were parallel and simultaneously engaged the full length of the shear line. A smaller, lighter and less expensive shear can thus be used for cutting even heavy steel plate.

To adapt the shear of the present invention for use in disintegrating all parts of the vessel the cutout is relatively long in its axial direction, say eighteen to twenty-four inches long. Thus, heavy beams as well as relatively thin steel plate may be sheared into scrap metal pieces by correspondingly retracting the die members a distance which is only slightly greater than the thickness of the portion being severed.

In another embodiment of the invention the circumferential cutout in the tube member is deleted and replaced by a slot in the piston. In this embodiment the concave die insert is mounted to the end of the tube and the piston protrudes past that end a sufficient distance so that the slot in the piston can reciprocate from without to within the tube, thereby passing the concave die insert. The axial end of the slot furthest removed from the corresponding end of the tube when the slot is disposed without the tube includes the cooperating concave die insert. The slot further extends a limited distance, say about one-half the diameter, into the piston to limit the depth to which a plate or other portion of the vessel may be inserted. The actual cutting again takes places by power actuating the piston so that the scrap metal piece is cut out at the tube end. When the piston is returned the severed piece of scrap metal freely drops out of the slot. Thereafter the press is repositioned as above described for severing the next piece of scrap metal. Although it is preferred to use the above discussed shear construction for salvaging such objects as vessels, in a given instance it might also be possible to salvage objects, particularly large plates with scissor-like shears. Such an agreement normally requires at least two angularly inclined cuts for severing a piece of scrap metal. Accordingly, such an approach will normally be economically less desirable.

Since the present invention shears the vessel into scrap metal the heretofore common flame cutting problems encountered when cutting heavily painted, glavanized or rusty steel plates, beams and the like are eliminated. Furthermore, the heretofore common initial dismantling of the vessel into components which are then hoisted on land for further cutting into scrap metal is replaced with one simple shearing operation to reduce material handling to a minimum. As the small pieces of scrap metal are sheared off the vessel they drop to the ground, or to the bottom of the interior of the vessel, and are intermittently picked up with suitable hoisting equipment such as hoisting magnets for transfer to a shipping vehicle such as a railroad car. Thus, the present invention renders the salvaging of a vessel, a railroad car or the like substantially more simple as compared with prior art methods.

In addition, the actual metal cutting speeds are greatly increased. Flame or torch cutting of steel beams or plate progresses relatively slowly and is measured in a few inches per minute. For dismantling a vessel flame cuts having an aggregate length of hundreds and thousands of yards are necessary. In contrast thereto, the present invention employs a quick shearing operation in which a single cut having a length of up to several feet is made in a matter of seconds. Thus, the scrap metal cutting speed achieved with the present invention is many times greater than the cutting speed that could be attained with prior art salvaging methods. This is in addition to the aforementioned simplifications and speedup in the handling of the scrap. Consequently, whereas the complete salvage of a vessel in accordance with prior art methods may have required as much as five to eight months it may now be salvaged in accordance with the present invention in as short a time as one to two months. Furthermore, in accordance with the present invention the salvaging operations can be carried on by a small crew of four to six men whereas in the past the torch cutting, dismantling, transfer and final cutting of the components of the vessel required crews of up to twenty to thirty men. It is, therefore, apparent that the present invention provides great advantages over the prior art and greatly increases the economy with which a vessel may be salvaged.

BRIEF DESCRIPTION OF THE DRAWINGS

FIG. 1 is a schematic, side elevational view of a section of a portion of a vessel being salvaged in accordance with the present invention;

FIG. 2 is a side elevational view of a portable constructed construction in accordance with the present invention and employed in salvaging the vessel illustrated in FIG. 1;

FIG. 3 is an enlarged cross-sectional view of the operative parts of the press illustrated in FIG. 2;

FIGS. 4–7 are schematic illustrations of a hydraulic actuating mechanism and control for operating the portable press illustrated in FIG. 3;

FIG. 8 is a front elevational view, in section, of a portable press constructed in accordance with another embodiment of the present invention; and FIG. 9 is a side elevational view, in section, and is taken along line 9—9 of FIG. 8.

Referring to FIGS. 1 and 2, a vessel 2 floating in a body of water 4 includes a hull 6 constructed of heavy steel plate 8 which is to be salvaged by disintegrating the steel plate into relatively small scrap metal pieces 10 one of which is illustrated in FIG. 1 as dropping from an upper hull edge 12 into the body of water. In accordance with the present invention the vessel is salvaged with a portable shear 14 that is suspended from a hoist or crane 16. Generally speaking, the shear includes an outer tubular member or tube 18 which has a hollow interior, preferably a cylindrical interior 20 which receives and reciprocably movably guides a cylindrical member of piston 22. A peripheral cutout 24 is disposed between ends 26, 28 of the tube and extends over approximately 180°. An axial end of the cutout mounts a semicircular die insert 30 which defines a concave cutting edge (not shown in FIGS. 1 and 2). A complementary convex die insert 32 is mounted to one end of piston 22. A power actuator 34 is provided for reciprocating piston 22 along the interior of tube 18 so that the cutting edges defined by die inserts 30, 32 move past each other. Consequently, a portion of an object, say a steel plate or beam 36 placed between the retracted inserts (as shown in FIG. 2) is severed when power actuator 34 is energized to move the inserts past each other. The severed piece of scrap metal is discharged through the interior of the tube past tube end 26.

In use shear 14 is hoisted above hull edge 12, piston 22 is retracted and cutout 24 is aligned with the hull edge so that the edge is substantially perpendicular to the axis of the shear. The piston is retracted a sufficient distance so that when the shear is lowered over the hull edge plate 8 can enter the space between the retracted die inserts 30 and 32 until the hull edge engages an axially oriented end 38 of the cutout. Power actuator 34 is now energized to force piston 22 to the left, as seen in FIG. 2, until the cutting edges of the die inserts have moved past each other. At that point a generally semicircular scrap metal piece 10 has been severed from the hull. By slightly tilting the shear the severed scrap metal piece will gravitationally drop from the interior of the tube 18 since the piece is much smaller than the cylindrical interior so that tight frictional engagements, wedgings and the like of the piece do not occur.

The power actuator is now energized to retract piston 22 to the position illustrated in FIG. 2 and the shear is moved to the left, as seen in FIG. 1, along hull edge 12 for severing the next scrap metal piece from the hull. As is illustrated in FIG. 1 this results in a scalloped hull edge 40. The process is repeated over and over along the length of the hull, each time severing another essentially arcuately shaped, relatively small piece of scrap metal. The scrap metal drops to the bottom of the vessel, or to the ground or on suitable scrap collecting surfaces mounted around the hull (not shown) and is intermittently picked up therefrom. The shear can be employed to cut along straight as well as convex or concave metal edges. To cut a solid floor, say the deck of the vessel, an initial hole of a sufficient diameter is burned or severed into the floor so that the shear can be axially extended therethrough. With the shear in a vertical position the deck is then severed into small pieces of scrap metal as above described. It if further possible to use shear 14 for salvaging under water structures, such as submerged vessels. For such an application the shear is used as above described except that all operations are carried on while it is submerged. Since the shear requires neither oxygen nor gas to sever the piece of scrap metal from the submerged vessel complications which so far prevented an economically feasable underwater salvage by torch cutting the vessel are eliminated.

Referring now to FIG. 3, a presently preferred embodiment of a portable shear 14 constructed in accordance with the invention is illustrated. Tube 18 is heavy walled and has a preferably slightly eccentric cylindrical interior 20 so that tube wall 42 opposite cutout 24 is of greater thickness than tube wall 44 aligned with the cutout. Furthermore, a gusset plate 46 is secured, i.e. welded to the exterior of tube 18 and extends in axial direction beyond the ends of cutout 24 to provide the tube with sufficient strength and rigidity as is further referred to below.

Piston 22 is a hollow piston having an inner chamber 48 and a head 50 which mounts die insert 32. The end of the piston opposite head 50 is defined by a cover plate 52 which includes a concentric bore that is slidable over an elongate length of pipe 54 coaxially mounted to outer tube 18. An inner end 56 of the pipe includes a coaxial disc 58 which engages inner chamber 48 and which further includes seal rings 60 to divide the chamber into a first power chamber 62 and a second return chamber 64.

The exterior surface of piston 22 includes an axially oriented groove or keyway 66 which slidably engages a longitudinally oriented key 68 secured to the interior surface 20 of the tube 18. The key-keyway arrangement allows axial reciprocating travel of the piston but prevents rotational piston movements.

Pipe 54 is fixedly secured to a flange plate 70 that is bolted to and 28 of tube 18. Pipe 54 comprises a double pipe having a first, central passage 72 which terminates in the first power chamber 62 and a second, annular passage 74 which terminates in a circular depression 76 of disc 58 and which in turn communicates with return chamber 64.

It will now be apparent that piston 22 is axially movable along a straight line between a first, retracted position in which disc 58 is disposed closely adjacent piston head 50 and in which convex die insert 32 is relatively remote from concave die section 38 and a second piston position, in which disc 58 is closely adjacent to cover plate 52 and the convex insert 32 has moved past the concave dye insert 30. During such movements pipe 54 and disc 58 as well as flange plate 70 remain stationary.

Referring now to FIGS. 3-7, the power driven operation of shear 14 in connection with a presently preferred hydraulic power actuator 34 will be described. FIGS. 4-7 schematically illustrate the hydraulic power actuator and associated hydraulic equipment, conduits and controls. Principally, they comprise a hydraulic pump 78 which communicates with a reservoir 80 for hydraulic fluid and which has a downstream pressure conduit 82 that leads to a three-way valve 84. From the valve three conduits lead to first and second power chambers 62 and 86 and the return chamber 64. For simplifying the description and schematic illustration each chamber is separately illustrated in the schematic FIGS. 4-7. In the shear illstrated in FIG. 3, the first power chamber is between piston head 50 and disc 58, the second power chamber 86 is between cover plate 52 and flange plate 70, and the return chamber is between cover plate 52 and disc 58. The first power chamber 62 communicates with three-way valve 84 via conduit 72; the second power chamber 86 communicates with the three-way valve via a conduit 88; and the return chamber communicates with the three-way valve via annular conduit 74 which in turn communicates with a tubular conduit 90 through a suitable passage 92 in end plate 70.

The first and second power chambers 62, 86 are provided for alternatively subjecting the piston to a lesser or greater axial force, respectively. When relatively thinwalled plate is sheared, the first power chamber is employed to thereby reduce fluid consumption during operation. When relatively heavy-walled plate is sheared the second power chamber, with its substantially larger effective piston area, alone or together with the first power chamber is employed. To effect the necessary hydraulic switching a pair of two-way valves 94 are interposed in hydraulic conduits 72 and 88 for connection of such conduits with a pressurized fluid conduit or with a fluid return conduit to the reservoir 80.

The actual hydraulics operation is as follows. Pump 78 is energized and assuming first that a power stroke of intermediate force is desired, second power chamber 86 is energized by fluidly communicating it via the associated two-way valve 94 with pressure conduit 82. Three-way valve is switched so that return chamber 64 communicates with reservoir 80 for discharging excess fluid from the return chamber to the reservoir while two-way valve 94 associated with first pressure chamber 62 is switched so that unpressurized fluid can be drawn from the reservoir to the first pressure chamber. This switching arrangement is graphically illustrated in FIG. 4.

After completion of the power stroke, three-way valve is switched so that pressure conduit 82 from pump 78 communicates with return chamber 64 while pressure chambers 62 and 86 communicate with reservoir 80. Thus, the pressurized fluid in the return chamber forces piston 22 to its retracted position, illustrated in FIG. 7, while excess fluid in pressure chambers 62 and 86 is returned to the reservoir.

Assuming now a desired power stroke for piston 22 in which a maximum force is exerted, three-way valve 84 is switched as illustrated in FIG. 6 while two-way valve 94 associated with first power chamber 62 is switched so that the first power chamber, in addition to the second power chamber 86 communicates with pressure line 82 from pump 78. As before, return chamber 64 discharges excess fluid to reservoir 80. In this operating mode a maximum force is exerted for cutting heavy plate or beams, for example, while the piston travels relatively slowly. On the return stroke, three-way valve 84 is again positioned as earlier described so that pressurized fluid fed to return chamber 64 forces piston 22 into its retracted position while excess fluid from power chambers 62 and 86 is returned to reservoir 80.

FIG. 5 illustrates the valving position for pressurizing small cylinder 62 only. In this operating mode a relatively small force (for cutting thin plate, for example) is exerted while the piston travels rapidly for high speed operation of the shear.

Referring again to FIG. 3, to further reduce power requirements during a shearing operation, and to facilitate the shearing of relatively heavy plate, say of up to one to two inches in thickness with a relatively light weight and small portable shear, at least one of the die inserts, say convex insert 32 has a helically shaped cutting edge 96 which cooperates with a circularly arcuate cutting edge 98 on insert 30. As a consequence, only a short length of the cutting edges 96 and 98 overlap at any given moment. During a power stroke of piston 22, therefore, a plate 100 is sequentially sheared as a function of the extent of the axial piston travel from a point of first engagement of the cutting edges, at one arcuate end of inserts 30, 32, to a point of last engagement at the other arcuate end of the inserts. Thus, at any given time only a small portion of the overall cross section along the shear line is actually being severed. The required shearing power is therefore substantially reduced.

Since all shearing action is performed by die inserts 30, 32, they are constructed of high quality tool steel to reduce the overall material costs for the shear. Furthermore, they are removably secured to the tube and the piston, respectively, with suitable bolts (not separately shown) so that they can be replaced and/or sharpened.

Referring now briefly to FIGS. 8 and 9, another embodiment of the invention comtemplates the construction of shear 102 from a continuous tube 104 and a piston 106 reciprocably mounted in the above-described manner within the interior of the tube. A concave die insert 108 is mounted to an end 110 of the tube. The piston includes a slit 114 disposed adjacent an end 112 of the piston which extend over an arc of approximately 180° to about the center of the piston. An axial edge 116 of the slit furthest removed from tube 104 is provided with a convex die insert 118. The slit is preferably angularly inclined with respect to the piston axis so that the convex die insert again defines a helical cutting edge 120 while the concave insert defines a semicircular cutting edge 122.

Shear 102 operates as follows. A power actuator 124 moves the piston into its retracted position in which slit 114 is wholly disposed outside tube 104. A steel plate 126 (shown in phantom lines in FIG. 9) is placed into the slit until the edge of the plate bottoms out against end wall 128 of the slit. The power actuator is now energized to move the piston in the opposite direction until die inserts 108 and 118 have passed each other and the slit is wholly disposed within tube 104. A semicircular portion of plate 126 is thereby severed from the remainder of the plate. Upon reversal of the piston movement and after slit 114 is again disposed outside tube 104 the severed semicircular piece of plate 126 drops from the slit. The shear is now repositioned along plate edge as earlier described for severing the next piece.

The actual dimensioning of the shear is of course determined by its application and the configuration of the structure which is to be salvaged therewith. In one practical embodiment of the invention, in which the shear is used for salvaging an ocean-going vessel of intermediate size, say of approximately 1,000 to 1,500 tons, the cylindrical interior 20 of tube 18 has a diameter of approximately 17 to 18 inches with cutout 24 extending over 180°. Thus, the scrap metal pieces obtained with this press have a maximum size of 17 to 18 inches by 8½ to 9 inches and a semicircular configuration. It is of course clear that as the salvaging operation progresses and shearing operations take place in the already scalloped portion of the hull the shape of the severed pieces will become irregular. This, however, in no way distracts from the value of the scrap metal pieces. Furthermore, the angular inclination of helical cutting edge 96 of insert 32 is between about 3° to about 10°. With such a configuration, the above-stated tube diameters and a fluid pressure of up to 5,000 psi plate as thick as several inches can be cut. Adjustments in the dimensioning of the components of the shear to better adapt it for particular applications can of course be made.

Furthermore, to enable the use of the shear for severing plate as well as relatively wide beams (see FIG. 2) cutout 24 preferably has an axial length of at least about 12 to 18 inches so that even the thickest beams encountered in vessels of the stated size can be placed in the cutout and sheared off.

I claim:

1. A method for converting large metallic strucutres into relatively small pieces of scrap metal for shipment of the scrap metal to a point of use, the method comprising the steps of providing a press having cooperating male and female dies, the female die defining a die opening, placing the press over a portion of the structure so that the portion is disposed between cooperating elements of the dies, positioning the press so that the portion of structure covers substantially less than the full outline of the female die opening to facilitate subsequent discharge of a piece of scrap metal from the opening, energizing the press to move the die elements into engagement with the portion, cutting a piece of scrap metal by sequentially severing the portion from the structure along a curved shear line from a beginning of the line to an end thereof, thereafter separating the die elements from engagement with the structure, moving the press along the structure to another portion, and cutting another piece of scrap metal by sequentially severing the other portion from the structure along the curved shear line.

2. A method according to claim 1 including a step of placing the dies over portions of the structure which have widely divergent thicknesses.

3. A method according to claim 1 wherein the female die opening has a circular outline, and wherein the step of positioning the press includes the step of positioning the press so that the cut-off piece of scrap metal has no more than approximately a semicircular outline complementary to the outline of the opening.

4. A method of converting large metal structures such as vessels into small sized metal scrap for shipment to and use in steel mills and the like comprising the steps of furnishing a portable metal press having a tube and a piston reciprocably disposed within the tube, the tube and the piston each having cooperating die segments positioned for shearing metal placed between them when the segments are moved against each other, placing the press over a portion of the structure along an edge thereof so that the portion is disposed between the segments, moving the segments towards each other while supporting the segment of the tube member on the remainder of the structure to prevent a wedging of the press, the portion and the structure and to thereby sever the portion from the structure, thereafter moving the press along the edge to another portion, and severing the other portion by again moving the segments against each other while supporting the segment of the tube on the remainder of the structure.

5. A method according to claim 4 wherein the step of moving the segments towards each other comprises the steps of supporting the structure over the substantially full extent of the tube segment, and sequentially engaging the segment of the piston with the portion to reduce the force required for severing the portion from the structure.

6. A method according to claim 5 wherein the step of placing the press over the edge of the structure comprises the step of placing the press over a width of the structure, as measured from the adjacent edge of the structure, which is less than the diameter of the opening in the tube to facilitate the removal of the severed portion from the opening.

7. A method according to claim 4 wherein the segment of the tube is disposed in a cutout of the tubular member intermediate the ends thereof, and including the step of retracting the piston after severing a portion and before the step of repositioning the press for severing the next portion of the structure.

8. A method according to claim 7 wherein the step of retracting comprises the step of retracting the piston a distance slightly greater than a thickness of the portion.

9. A method according to claim 8 including the step of severing a further portion from the structure having a thickness substantially different from that of the first mentioned portion, and wherein the step of retracting the piston for severing the further portion comprises the step of retracting the piston a distance slightly greater than the different thickness of the further portion.

10. A method of salvaging an ocean going vessel in the form of small pieces of scrap metal having a sufficiently small size so that the pieces can be used by steel mills without a further reduction in their size, the method comprising the steps of providing a portable shear, positioning the shear on an edge of the vessel, actuating the shear to sever from the vessel such a piece of scrap metal, repositioning the shear on the vessel, repeating the actuating step, and collecting the sheared off pieces by discharging the severed pieces into a hold of the vessel, and continuing the steps of repositioning and repeating until an upper edge of the vessel's hull is relatively closely adjacent the waterline.

11. A method according to claim 10 wherein the step of shearing comprises the steps of sequentially making at least two, angularly inclined and converging cuts to sever such a piece.

12. A method according to claim 10 including the step of removing the pieces from the hull and onto a transport vehicle for the pieces.

13. A method according to claim 12 wherein the vessel is in a body of water, and including the step of moving the hull with the pieces in it through the body of water to an unloading place for transfer of the pieces onto the vehicle.

* * * * *